US011976579B2

(12) United States Patent
Slight et al.

(10) Patent No.: US 11,976,579 B2
(45) Date of Patent: May 7, 2024

(54) EXHAUST COMPONENT COOLING

(71) Applicant: McLaren Automotive Limited, Woking (GB)

(72) Inventors: Arthur Slight, Woking (GB); Michael Judge, London (GB)

(73) Assignee: McLaren Automotive Limited, Woking (GB)

( * ) Notice: Subject to any disclaimer, the term of this patent is extended or adjusted under 35 U.S.C. 154(b) by 0 days.

(21) Appl. No.: 17/672,100

(22) Filed: Feb. 15, 2022

(65) Prior Publication Data

US 2022/0260002 A1 Aug. 18, 2022

(30) Foreign Application Priority Data

Feb. 16, 2021 (GB) .................................. 2102150

(51) Int. Cl.
*F01N 13/10* (2010.01)
(52) U.S. Cl.
CPC ......... *F01N 13/102* (2013.01); *F01N 13/107* (2013.01); *F01N 2240/02* (2013.01); *F01N 2260/022* (2013.01); *F01N 2510/02* (2013.01)
(58) Field of Classification Search
CPC ........... F01N 2240/02; F01N 2260/022; F01N 2510/02; F01N 3/10; F01N 3/2882; F01N 13/14; F01N 13/102; F01N 13/107; F01P 3/20; F01P 11/04; F01P 11/16; F02B 77/11
USPC .......................................................... 60/321
See application file for complete search history.

(56) References Cited

U.S. PATENT DOCUMENTS

| 2004/0238276 A1 | 12/2004 | Matias et al. |
| 2008/0115492 A1 | 5/2008 | Freese V |
| 2014/0230799 A1 | 8/2014 | Parikh et al. |
| 2018/0003100 A1* | 1/2018 | Asaura ................ F01N 13/009 |

FOREIGN PATENT DOCUMENTS

| DE | 4030652 | 4/1992 |
| DE | 102017206889 | 10/2018 |
| DE | 102017206889 A1 * | 10/2018 |
| GB | 2562226 | 11/2018 |

(Continued)

OTHER PUBLICATIONS

Extended European Search Report and Written Opinion in European Appln. No. 22157129, dated Jul. 22, 2022, 6 pages.

(Continued)

*Primary Examiner* — Kenneth J Hansen
*Assistant Examiner* — Kelsey L Stanek
(74) *Attorney, Agent, or Firm* — Fish & Richardson P.C.

(57) ABSTRACT

A vehicle comprising: an engine comprising two banks of cylinders having axial directions angled relative to each other to form a region running between the axial directions of the two banks; a plurality of exhaust components located in the region; and a heat shield enclosing the exhaust components between the engine and the heat shield, the heat shield comprising an inner surface facing the exhaust components, a first heat shield inlet and a heat shield outlet, and the heat shield being configured to channel an airflow between the first heat shield inlet and the heat shield outlet over the inner surface of the heat shield.

20 Claims, 6 Drawing Sheets

(56) References Cited

FOREIGN PATENT DOCUMENTS

JP    2020133564    8/2020
SU        979663   12/1982

OTHER PUBLICATIONS

Search Report in United Kingdom Appln. No. GB2102150.6, dated , 5 pages.
Search Report in United Kingdom Appln. No. GB2102150.6, dated Jul. 1, 2021, 5 pages.
Office Action in European U.S. Appl. No. 22/157,129, dated Nov. 22, 2023, 4 pages.

* cited by examiner

EXHAUST COMPONENT COOLING

CROSS-REFERENCE TO RELATED APPLICATIONS

This application claims priority to GB Patent Application Serial No. 2102150.6, filed on Feb. 16, 2021, the entire contents of which are hereby incorporated by reference.

This invention relates to a vehicle having a heat shield which encloses exhaust components between the heat shield and an engine.

A typical vehicle will contain many heat sources including the engine if the vehicle is powered by an internal combustion engine, and electric motors and batteries if the vehicle is an electric or hybrid vehicle. The heat generated by the engine can cause a number of vehicle components to become heat sources within the vehicle. For instance, the exhaust components become hot once the engine is running due to the exhaust gases flowing through them. Heat exchangers, such as radiators, also become hot due to coolant flowing through them which has been heated by heat sources, such as the engine, within the vehicle.

Some internal combustion engines are configured to have multiple banks of cylinders which power a common crank shaft. In some cases, the engine has two banks of cylinders. These may be angled relative to each other and where the angle between the two banks is less than 180° the engine is generally known as a V-engine. In some cases, the engine has four banks of cylinders which are all angled relative to each other and where the angle between adjacent banks is less that 90° the engine in generally known as a W-engine.

Taking the V-engine as an example, the exhaust components may sometimes be located in the V-region of the engine, that is in the region between the two banks of cylinders. This means that the exhaust ports of the engine are on the inboard sides of the two banks of cylinders so that they output exhaust into exhaust manifolds located in the region between the two banks of cylinders. Other exhaust related components such as a turbine of a turbo may also be located in the region between the two banks of cylinders. Such an engine may be described as a Hot-Vee engine as hot exhaust components are located in the V-region of the engine. A similar situation would arise for a W-engine where there would be two separate V-shaped regions that contain exhaust components.

As the exhaust components tend to be packaged tightly within the V-region of the engine due to space and packaging requirements, it can be difficult to provide sufficient cooling to this region to reduce the effect the heat generated by these exhaust components has on other components in and around this region in a Hot-Vee engine. This is especially true in a mid- or rear-engine vehicle. It would therefore be desirable to have an improved way of cooling a Hot-Vee engine.

According to a first aspect of the present invention there is provided a vehicle comprising: an engine comprising two banks of cylinders having axial directions angled relative to each other to form a region running between the axial directions of the two banks; a plurality of exhaust components located in the region; a heat shield enclosing the exhaust components between the engine and the heat shield, the heat shield comprising an inner surface facing the exhaust components, a first heat shield inlet and a heat shield outlet, and the heat shield being configured to channel an airflow between the first heat shield inlet and the heat shield outlet over the inner surface of the heat shield.

The heat shield may comprise a second heat shield inlet and the heat shield may be configured to channel an airflow between the second heat shield inlet and the outlet over the inner surface of the heat shield.

The heat shield may comprise an air diverter configured to disperse an airflow entering from the first heat shield inlet over the inner surface of the heat shield. The air diverter may be configured to disperse an airflow entering from the second heat shield inlet over the inner surface of the heat shield. The air diverter may comprise a first diverter inlet and a plurality of diverter outlets, the air diverter may be located within the heat shield so that the airflow entering from the first heat shield inlet is directed to diverter outlets from the first diverter inlet to disperse the airflow entering from the first heat shield inlet over the inner surface of the heat shield. The air diverter may comprise a plurality of channels running between the first diverter inlet and a respective diverter outlets. The air diverter may comprise a second diverter inlet, the air diverter may be located within the heat shield so that the airflow entering from the second heat shield inlet is directed to diverter outlets from the second diverter inlet to disperse the airflow entering from the second inlet over the inner surface of the heat shield. The diverter outlets may be divided into two sets, the first diverter inlet may be connected to the first set of diverter outlets and the second diverter inlet may be connected to the second set of diverter outlets. The air diverter may be located within the heat shield so that the first heat shield inlet is aligned with the first diverter inlet and the second heat shield inlet is aligned with the second diverter inlet.

The vehicle may comprise: a first heat exchanger; a first fan configured to cause air to flow through the first heat exchanger; and a first duct connected between the first fan and the first heat shield inlet so that when the first fan is active the first duct channels air between the first fan and the first heat shield inlet. The heat shield may comprise a first opening between the inner surface and an outer surface of the heat shield, and the vehicle may comprise a third duct comprising a third duct outlet positioned to direct an airflow running through the third duct onto the first opening, the third duct may be connected between the first fan and the third duct outlet. The vehicle may comprise: a second heat exchanger; a second fan configured to cause air to flow through the second heat exchanger; and a second duct connected between the second fan and the second heat shield inlet so that when the second fan is active the second duct channels air between the second fan and the second heat shield inlet. The heat shield may comprise a second opening between the inner surface and an outer surface of the heat shield, and the vehicle may comprise a fourth duct comprising a fourth duct outlet positioned to direct an airflow running through the fourth duct onto the second opening, the fourth duct may be connected between the second fan and the third duct outlet.

The vehicle may comprise a turbocharger, the turbocharger may comprise a compressor and a turbine, and wherein the plurality of exhaust components may comprise the turbine of the turbocharger. The turbocharger may comprise a waste valve and the vehicle may comprise a first actuator located outside of the heat shield and a first linkage connected between the waste valve and the first actuator, the first linkage may run through the first opening. The vehicle may comprise a turbocharger per bank of cylinders, each turbocharger may comprise a compressor and a turbine, and wherein the plurality of exhaust components may comprise the turbines of the turbochargers. The turbochargers may each comprise a respective waste valve and the vehicle may comprise an actuator per waste valve located outside of the heat shield and a linkage per waste valve connected between respective waste valves and respective actuators, a first linkage running through the first opening and a second linkage running through the second opening. The compressor(s) may be located outside of the heat shield. The compressor(s) may be located outside of the enclosed region. The first heat shield inlet may be located closer to the turbine(s) than the heat shield outlet. The second heat shield inlet may be located closer to the turbine(s) than the heat shield outlet.

The exhaust components may comprise one or more of an exhaust manifold, an exhaust pipe, and an exhaust gas treatment device. The heat shield may comprise an insulation layer sandwiched between metal layers. The insulation layer may have a thickness which varies over the heat shield.

The vehicle may comprise: an occupant cabin; a retractable roof configured to move between a deployed configuration where the roof covers the occupant cabin and a retracted configuration; a housing configured to house the retractable roof when the roof is in the retracted configuration, the housing being positioned at least partially over the heat shield; and a moveable cover configured to close the housing.

The vehicle may comprise: at least one passenger seat located in an occupant cabin; and a luggage storage area located behind the passenger seat, the luggage storage area being positioned at least partially over the heat shield.

The heat shield may comprise a first heat shield piece, a second heat piece and a gasket comprising a cylindrical portion and a flat portion joined to the cylindrical portion, the first heat shield piece and second heat shield piece may be joined together, the gasket may be located between the first heat shield piece and the second heat shield piece so that the flat portion is between the first heat shield piece and second heat shield piece and the cylindrical portion contacts both the first heat shield piece and second heat shield piece.

The present invention will now be described by way of example with reference to the accompanying drawings. In the drawings.

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a vehicle comprising an engine comprising two banks of cylinders having axial directions angled relative to each other to form a region running between the axial directions of the two banks. The vehicle further comprises a plurality of exhaust components located in the region and a heat shield enclosing the exhaust components between the engine and the heat shield. The heat shield comprises an inner surface facing the exhaust components, a first heat shield inlet and a heat shield outlet. The heat shield being configured to channel an airflow between the first heat shield inlet and the heat shield outlet over the inner surface of the heat shield.

Figure 1:
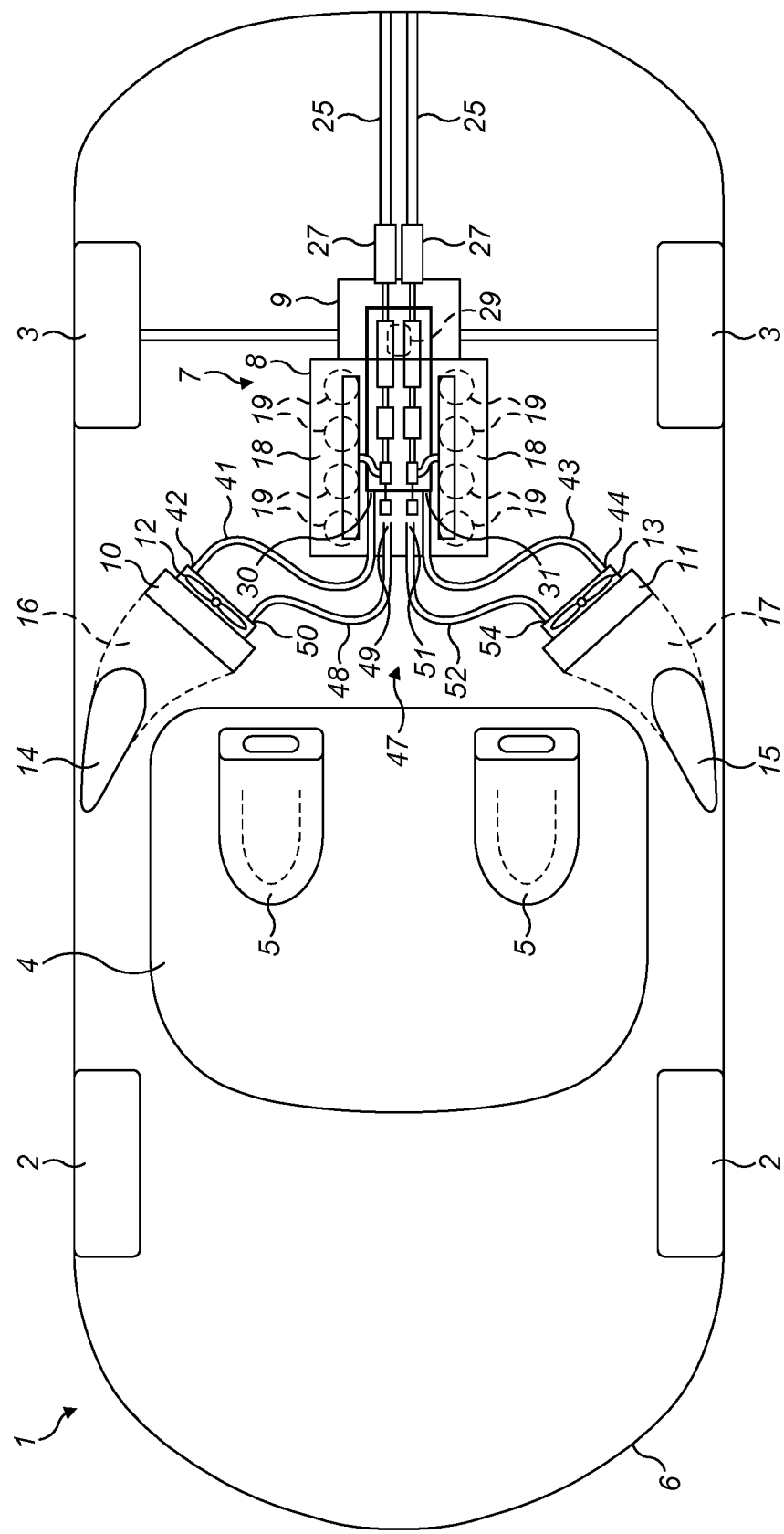
FIG. 1 shows a schematic plan view of a vehicle.

FIG. 1 shows a vehicle 1. The vehicle 1 may be an automobile. The vehicle 1 may be a car. The vehicle 1 comprises front wheels 2 and rear wheels 3. The front of the vehicle is defined with reference to the primary motion direction of the vehicle 1. The front of the vehicle 1 points in the primary motion direction of the vehicle. Generally, a vehicle has a primary motion direction that is the forward direction. The vehicle 1 comprises an occupant compartment 4. The occupant compartment 4 may comprise one or more seats 5 for occupants of the vehicle to sit in. The occupant compartment 4 may accommodate a driver. The occupant compartment may accommodate one or more passengers. The vehicle 1 may comprise controls located within the occupant compartment 4 to enable an occupant to control the motion of the vehicle. The occupant compartment 4 may also be known as a passenger compartment.

The vehicle comprises a vehicle body 6. The vehicle body comprises a plurality of body panels. For example, the body panels may include bonnet panel(s), side door panel(s), and rear deck panel(s). The vehicle body 6 has an outer surface made up of the outer surface of the body panels. The outer surface of the vehicle body 6 defines the exterior surface of the vehicle 1.

The vehicle comprises a powertrain 7. The powertrain comprises an internal combustion engine 8. The powertrain 7 may comprise one or more electrical machines that are capable of providing motive power to the drive wheels of the vehicle. The powertrain shown in FIG. 1 comprises a gearbox and differential shown generally at 9. At least some of the wheels may be coupled to the powertrain to receive motive power from the powertrain 7 and thus are drive wheels of the vehicle. As shown in FIG. 1, the powertrain 7 is connected to the rear wheels 3. It will be appreciated that the powertrain 7 could equally be connected to the front wheels 2 and/or both front and rear wheels 2, 3 of the vehicle 1.

As shown in FIG. 1, the powertrain 7 may be located in the middle or towards the rear of the vehicle. The powertrain 7 may be located behind the occupant compartment 4. The powertrain 7 may be located between the front and rear axles of the wheels 2, 3. The engine 8 may be located between the front and rear axles of the wheels 2, 3. The vehicle 1 may be a mid-engine vehicle. The vehicle may be a rear-engine vehicle. Other drive units which do not form part of powertrain 7 may be present in the vehicle 1. For instance, the vehicle may comprise one or more electric motors which drive wheels of the vehicle 1 separately from the powertrain 7.

The vehicle 1 comprises a temperature regulating system configured to carry coolant between heat sources of the vehicle and one or more heat exchangers 10, 11 to remove heat from the coolant. The temperatures regulating system comprises tubes and at least one pump to channel the coolant between the heat sources and the heat exchangers. The heat exchangers would typically be air-cooled radiators arrange to dump heat in the coolant into the environment. Shown in FIG. 1 are two heat exchangers 10, 11. The heat exchangers 10, 11 may receive coolant that has be in contact with parts of the engine 8 and so coolant that has been heated by the engine 8.

These heat exchangers 10, 11 may be located anywhere within the body of the vehicle. However, it is advantageous if they are located in a position that enables airflow to be channelled through them. For instance, they may be located at the front of the vehicle to enable air flow that contacts the front surfaces of the vehicle body generated by the motion of the vehicle 1 to be channelled through them. They may be located at the sides of the vehicle to enable air flow that moves past the sides of the vehicle body to be channelled through them. They may be located at the rear of the vehicle to enable air flow that passes the rear quarter of the vehicle to be channelled through them. Heat exchangers located at the side and rear of the vehicle 1 are particularly useful in mid- and rear-engine vehicles. As pictured in FIG. 1, the heat exchangers are located towards the rear of the vehicle 1. They are located behind occupant compartment 4.

The vehicle 1 comprises a first fan 12 for the first heat exchanger 10. The vehicle 1 comprises a second fan 13 for the second heat exchanger 11. The fans 12, 13 cause air to flow through their respective heat exchanger 10, 11. The fans 12, 13 may operate when the engine is running but the vehicle 1 is not moving fast enough to cause a sufficient flow of air through the heat exchangers 10, 11 to adequately cool the coolant flowing through the heat exchanger 10, 11. For instance, the vehicle 1 may be stationary or moving at low speed. The fans 12, 13 may run at all times when the engine 8 is running. The fans 12, 13 may continue to operate for a length of time after the engine 8 has been switched off. The length of time may be predetermined or may be calculated based on the current temperature of the engine, coolant, other heat sources or a combination of these factors.

An air supply is provided to the heat exchangers 10, 11 by respective duct openings 14, 15 and ducts 16, 17. The duct openings 14, 15 may be located in side panels of the vehicle 1. The side panels may be side doors of the vehicle. This is particularly advantageous where the vehicle 1 is a mid-engine or rear-engine vehicle.

Figure 2:
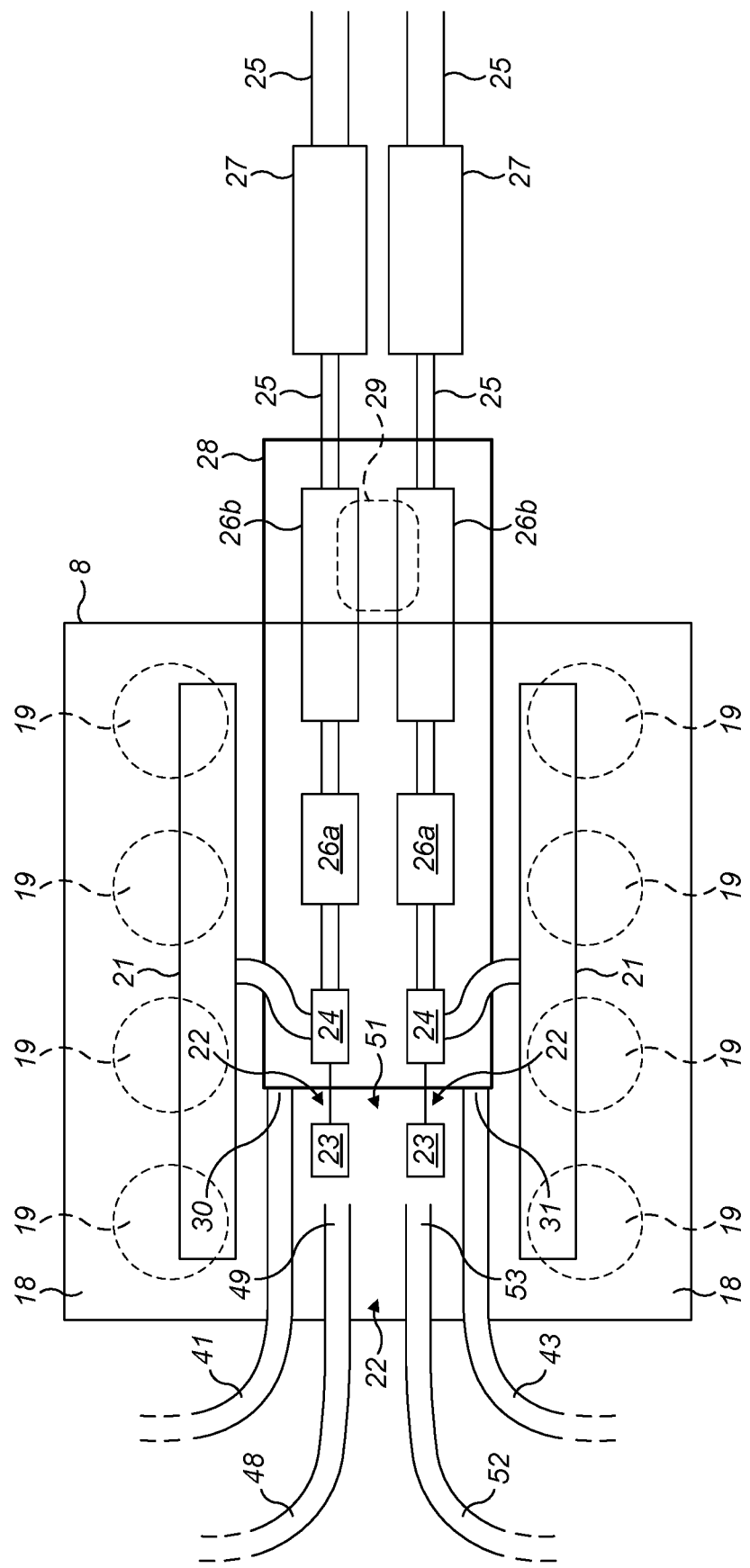
FIG. 2 shows a plan schematic close-up view of an engine and associated components of the vehicle.
Figure 3:
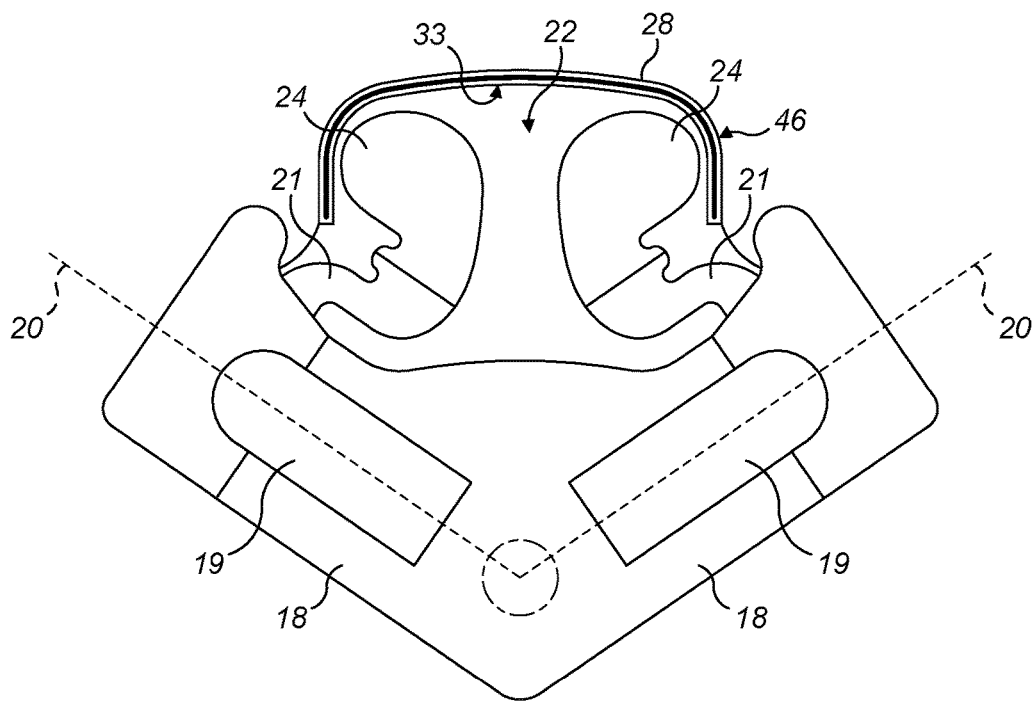
FIG. 3 shows a cut-through view of the engine and associated components.

FIG. 2 shows a close-up version of the engine 8 and associated components as shown in FIG. 1. The engine comprises two banks 18 of cylinders 19. The cylinders in each bank are side-by-side along the bank. The two banks 18 of cylinders 19 are angled relative to each other. The cylinders 19 each have axial directions 20 that run along their respective lengths. The axial directions 20 of the two banks of cylinders 19 are angled relative to each other as shown in FIG. 3. FIG. 3 shows a cut through view of the engine 8 and associated components. For a V-shaped engine, the angle between the axial directions 20 of the two banks 18 of cylinders is less than 180°.

Therefore, the engine 8 shown in FIGS. 1 to 3 is a V-shaped engine. The two banks 18 of cylinders 19 run in substantially parallel directions to each other along the line of cylinders. Thus, the axial directions 20 of the cylinders 19 in a respective bank 18 are generally parallel to each other. The cylinders 19 may share a common crank shaft. Each cylinder 19 comprises a piston that is configured to move slideably within the cylinder 19. A respective piston rod is connected to each piston. Each piston rod is connected to the crank shaft so that a translational movement of the piston causes a rotational movement of the crank shaft. The angle of the two banks 18 forms a region 22 running between the axial directions of the two banks. This region 22 is located within the V-shape formed by the axial directions of the two banks. The region 22 runs between the two banks 18 of cylinders 19. It will be understood that the region 22 may extend beyond the longitudinal length of the engine 8.

Each cylinder 19 comprises at least one inlet port and one exhaust port. Typically more than one inlet port and exhaust port is present. Connected to the inlet ports is an inlet manifold. A separate inlet manifold may be present for each bank 18 of cylinders 19. As shown in FIGS. 1 to 3 connected to the exhaust ports is an exhaust manifold 21. As shown in FIGS. 1 to 3 separate exhaust manifolds 21 are connected to each bank of cylinders. Thus, there are two exhaust manifolds 21 one for each bank 18 of cylinders 19. The exhaust manifolds 21 may be at least partially located in the region 22 running between the two banks 18. The exhaust manifolds 21 may be fully located in the region 22 running between the two banks 18.

The exhaust manifolds 21 may be described as exhaust components. The exhaust components guide the exhaust 8 emitted from the exhaust ports of the engine 8 to outlets in exhaust pipes remote from the exhaust ports of the engine 8.

The vehicle 1 shown in FIGS. 1 to 3 as comprising two turbochargers 22. One turbocharger per bank 18 of cylinders 19 is present. It will be understood that the vehicle 1 may comprise only one turbocharger 22 or a plurality of turbochargers 22. Each turbocharger 22 comprises a compressor 23 and a turbine 24. The compressor 23 and turbine 24 of the turbocharger 22 are coupled together so that rotation of the turbine 24 causes rotation of the compressor 23. The compressor 23 and turbine 24 may be coupled together mechanically. The compressor 23 and turbine 24 may be coupled together electrically, as in a generator may be attached to turbine 24 and a electric motor to compressor 23 and rotation of turbine 24 causes the generator to generate electrical energy which is passed to the electric motor of compressor 23 to cause the compressor 23 to rotate. The compressor 23 of the turbocharger 22 is connected to an inlet manifold to charge intake gasses. The turbine 24 is connected to an exhaust manifold 21 so that exhaust gases cause the turbine 24 to rotate. As shown in FIGS. 1 to 3, a respective turbocharger 22 is attached to a respective exhaust manifold 21.

The vehicle comprises a plurality of exhaust components. At least some of these exhaust components may be located in the region 22. The exhaust components may comprise one or more of:

An exhaust manifold 21.

The turbine 24 of a turbocharger 22.

An exhaust pipe. Some of the exhaust pipes are labelled as 25. It will be apparently that other exhaust pipes may be present to connect other exhaust components together to channel the flow of exhaust gases between the various exhaust components.

An exhaust gas treatment device 26. The exhaust gas treatment device may be a catalytic converter 26a and/or a gas particulate filter 26b.

A silencer 27. The vehicle 1 may comprise more than one silencer per bank of cylinders or may comprise one silencer into which the exhaust gases of both banks of cylinders flow or any combination of these configurations.

As pictured in FIGS. 1 to 3, the vehicle 1 comprises a turbocharger 22 per bank 18 of cylinders 19. The vehicle 1 comprises an exhaust manifold 21 per bank 18 of cylinders 19. The vehicle 1 comprises at least one exhaust gas treatment device 26 per bank 18 of cylinders 19. Each of these components may be directly connected to the next or may be connected by an exhaust pipe.

As described herein, the vehicle having exhaust components located within the region 22 means that vehicle components that become hot during use are present in the region 22. This means that when the engine 8 is running there is a hot region present within the V-shaped region defined by the angle of the banks 18 of cylinders 19. This is generally described as a Hot-Vee engine. This is opposite to an engine which has the intake components within the region 22. As the intake components control the flow of airflow into the engine these components are relatively much cooler than the exhaust components.

The presence of the exhaust components in the V-shaped region 22 causes a problem for the heat management of those components. This is because they are located in a tightly packaged region of the engine as so it is difficult to obtain good airflow through this region. This is particularly true in a mid-engine or rear-engine vehicle as the occupant compartment 4 blocks a direct path to the engine 8 from oncoming airflow during forward motion. This is a problem both in attempting to cool those exhaust components and also in managing the transfer of heat energy to other parts of the vehicle in close proximity to the exhaust components. For instance, body panels may be close to the exhaust components which someone standing outside the vehicle could touch and burn themselves on. Alternatively, there may be a housing for luggage or a retractable roof located close to those exhaust components and it would be undesirable for that housing to reach temperatures even remotely close to the temperature of those exhaust components when the engine 8 is running.

Figure 4:
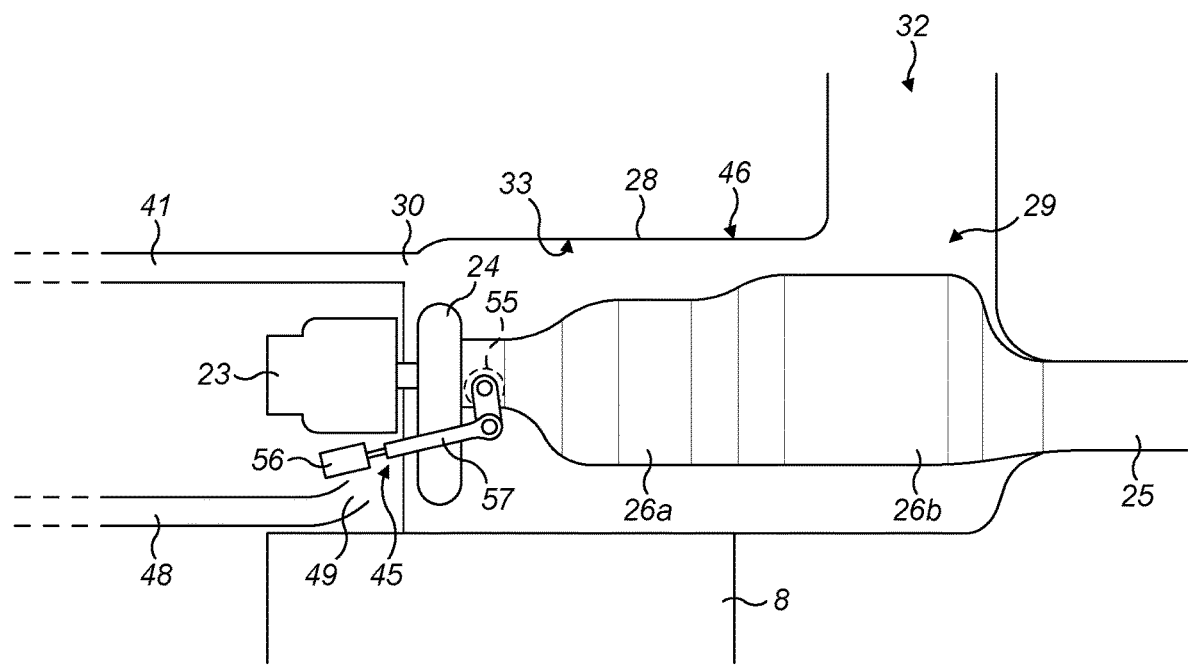
FIG. 4 shows a cut-through view of a heat shield and exhaust components.

The vehicle 1 comprises a heat shield 28 which guides an airflow over an inner surface of the heat shield 28. The guiding of the airflow contains the heat generated by the exhaust components enclosed by the heat shield and forces the air heated by the exhaust components to be moved towards an outlet 29 located towards the rear of the vehicle 1. The guiding of the airflow cools the heat shield 28 to isolate the heat generated by the exhaust components. This isolates the heat generated by the exhaust components within the heat shield 28 and so isolates the heat from being transmitted to components outside of the heat shield 28. As shown best in FIGS. 3 and 4, the heat shield 28 attaches to the engine 8 to enclose exhaust components located within the region 22. FIG. 4 shows a schematic cut-through view of the heat shield and exhaust components running along the longitudinal direction of the engine 8. The heat shield 28 may attach to exhaust manifolds 21 running along the longitudinal direction of the engine 8. The heat shield 28 may attach directly to the engine 8. The heat shield 28 may attach to the engine 8 via another component in some places and directly to the engine 8 in others. The attachment of the heat shield 28 to the engine 8 encloses exhaust components between the engine 8 and the heat shield 28. The exhaust components are enclosed within the region 22. The heat shield 28 may be formed of more than one piece and these pieces are joined together to form the heat shield 28.

Figure 10:
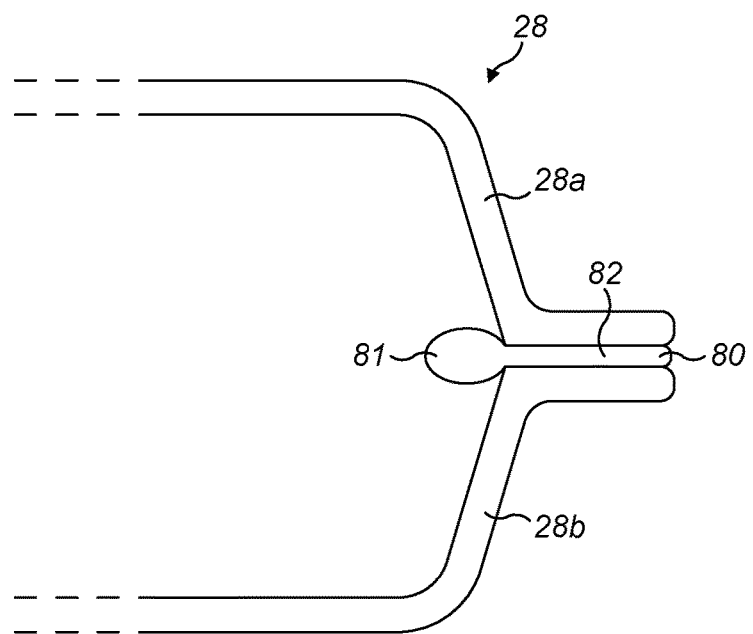
FIG. 10 shows a schematic cut-through view of the heat shield.

An example of the heat shield 28 being formed of more than one piece is shown in FIG. 10. FIG. 10 is a cut-through view of the heat shield 28. The other components that are present within the heat shield 28 have been removed for clarity and it will be appreciated that the description associated with the other figures also applies to that shown in FIG. 10. The heat shield 28 shown in FIG. 10 comprises a first heat shield piece 28a and a second heat shield piece 28b. Each piece comprises a flanged region. The flanged regions are fixed together. The flanged regions may be fixed together by bolts or other attachments. To seal the join between the two pieces, the heat shield 28 comprises a gasket 80. The gasket 80 is located between the flanged regions of the first heat shield piece 28a and the second heat shield piece 28b. The gasket 80 comprises a cylindrical portion 81. The cylindrical portion 81 is attached to a flat portion 82 that extends from the cylindrical portion 81. The flat portion 82 is located between the flanged regions of the first and second heat shield pieces so that when the two pieces are joined together the flat portion 82 provides a seal between the two pieces. The cylindrical portion 81 in pinched by the two pieces where each flanged region ends and is joined to the rest of the heat shield piece. It will be appreciated that the heat shield may be formed of a plurality of pieces joined together in a similar fashion to that described with reference to the first heat shield piece and second heat shield piece.

Exhaust components that may be enclosed within the region are one or more of:
- An exhaust manifold 21.
- The turbine 24 of a turbocharger 22.
- An exhaust pipe. Some of the exhaust pipes are labelled as 25. It will be apparently that other exhaust pipes may be present to connect other exhaust components together to channel the flow of exhaust gases between the various exhaust components.
- An exhaust gas treatment device 26. The exhaust gas treatment device may be a catalytic converter 26a and/or a gas particulate filter 26b.

The compressor 23 of a turbocharger 22 is located outside of the heat shield 28.

As shown in FIGS. 1 to 4, the exhaust components may run within region 22 but extend beyond the longitudinal end of the engine 8. In this case, the heat shield wraps around those exhaust components that extend beyond the longitudinal end of the engine 8 to enclose those exhaust components within the region 22.

The heat shield 28 may have more than one hole through which vehicle components can pass. Advantageously, the heat shield 28 seals to the vehicle component that passes through the hole. For instance, there may be holes for connections to lambda sensors for the engine 8 to pass through. As shown in FIGS. 1 to 4, exhaust pipe(s) may pass through the heat shield 28. The heat shield 28 seals to the exhaust pipe(s) to limit the flow of air through the holes through which the exhaust pipe(s) pass.

The heat shield 28 may comprise an insulation layer sandwiched between metal layers. This is shown in FIG. 3 by the thicker darker line within the heat shield. The insulation layer may not be present over the whole of the heat shield and may only be present in some of the heat shield. The insulation layer may have a thickness which varies over the heat shield.

Figure 5:
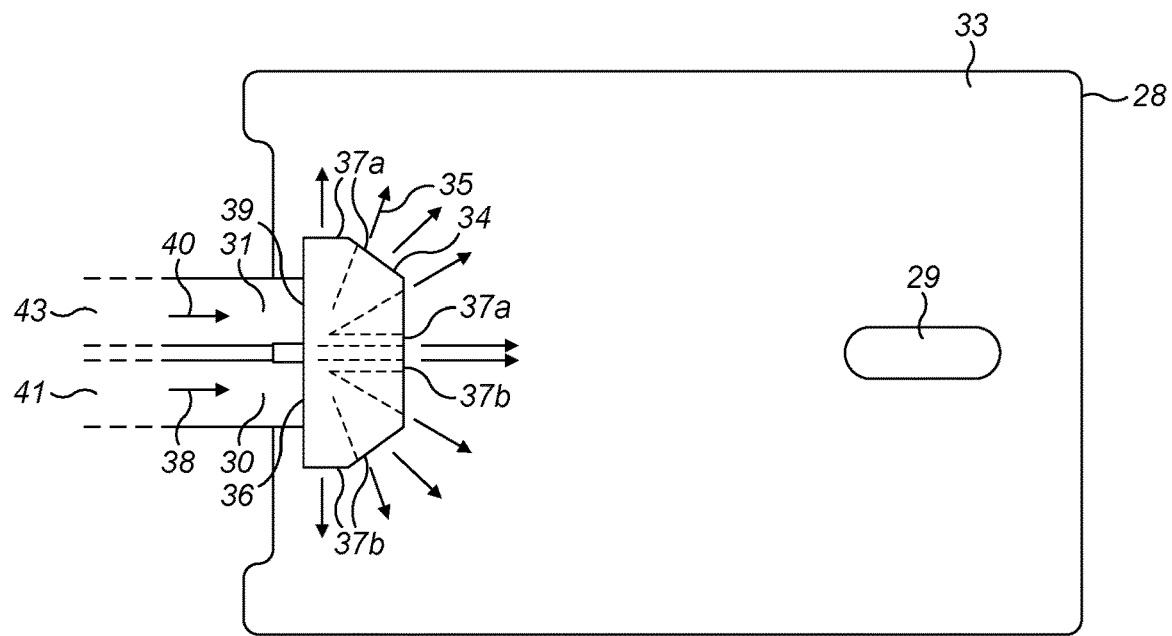
FIG. 5 shows a schematic plan view of an interior upper surface of the heat shield.
Figure 8:
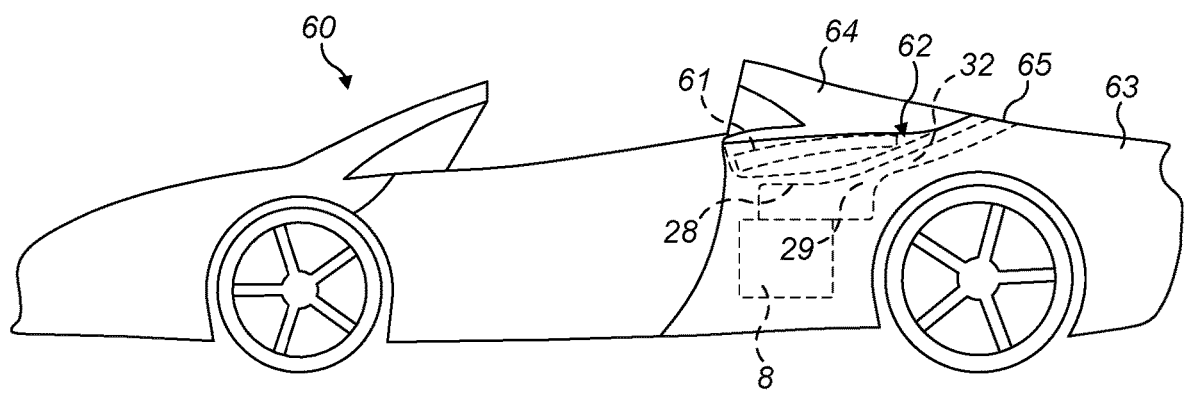
FIG. 8 shows a vehicle having a retractable roof in its retracted configuration.

The heat shield 28 comprises a first heat shield inlet 30. As shown in FIGS. 1 to 5, the heat shield 28 comprises a second heat shield inlet 31. FIG. 5 shows a plan view of the interior upper surface of the heat shield 28. As discussed herein, the heat shield 28 comprises a heat shield outlet 29. The heat shield outlet 29 directs an airflow to outside of the vehicle 1. The heat shield outlet 29 is shown as being connected to an outlet duct 32 which runs to an external surface of the vehicle to direct the airflow to the outside of the vehicle 1. The outlet duct 32 may run in an upward direction. The outlet duct 32 may run in a generally directly upward direction or may be angled towards the rear of the vehicle 1. The outlet duct 32 may run to a location 65 on a rear deck of the vehicle 1 to output the airflow. This is as shown in FIG. 8. Equally the outlet duct 32 may run to a location on a rearwardly facing body panel of the vehicle 1 or a side body panel of the vehicle 1 to output the airflow.

The heat shield 28 is configured to channel an airflow between the first heat shield inlet 30 and the heat shield outlet 29. The heat shield channels the airflow over an inner surface 33 of the heat shield 28. The heat shield 28 is configured to channel an airflow between the second heat shield inlet 31 and the heat shield outlet 29. The first heat shield inlet 30 and/or the second heat shield inlet 31 run through the heat shield 28 at positions close to the top portion of the inner surface 33 of the heat shield 28. The first heat shield inlet 30 and/or the second heat shield inlet 31 are orientated to direct an airflow flowing through the inlet(s) on to the inner surface 33 of the heat shield 29. In this way, an airflow entering the first heat shield inlet 30 and/or the second heat shield inlet 31 runs over the inner surface of the heat shield 28. The heat shield 28 may have at least some rounded corners to assist in keeping the airflow running over the inner surface of the heat shield 28.

The heat shield 28 may comprise an air diverter 34. The air diverter 34 is shown in FIG. 5 but is omitted from FIG. 4 for clarity. The air diverter 34 is configured to disperse an airflow (the dispersing of the airflow shown generally by the arrows 35 inside the heat shield 28) entering from the first heat shield inlet 30 and/or the second heat shield inlet 31 over the inner surface of the heat shield 28. The air diverter 34 is attached to the heat shield 28.

The air diverter 34 comprises a first diverter inlet 36 and a plurality of diverter outlets 37. The air diverter 34 is positioned within the heat shield 28 so that the airflow 38 entering from the first heat shield inlet 30 is directed to diverter outlets 37 from the first diverter inlet 36. The air diverter 36 may be located within the heat shield so that the first heat shield inlet 30 is aligned with the first diverter inlet 36. The direction of the airflow in this way disperses the airflow entering from the first heat shield inlet 30 over the inner surface 33 of the heat shield 28. The diverter outlets are oriented to point in different directions so that the airflow is spread out over the inner surface 33 of the heat shield 28. The air diverter 34 comprises a plurality of channels with each channel running to a respective diverter outlet 37.

As shown in FIGS. 1 to 5, the air diverter 34 comprises a second diverter inlet 39. The air diverter 34 is positioned within the heat shield 28 so that the airflow 40 entering from the second heat shield inlet 31 is directed to diverter outlets 37 from the second diverter inlet 36. The air diverter 36 may be located within the heat shield so that the second heat shield inlet 31 is aligned with the second diverter inlet 36. The direction of the airflow in this way disperses the airflow entering from the second heat shield inlet 31 over the inner surface 33 of the heat shield 28.

The diverter outlets 37 may be divided into two sets. The first diverter inlet 36 may be connected to the first set of diverter outlets 37a and the second diverter inlet 36 may be connected to the second set of diverter outlets 37b. The air diverter 34 may comprise a first set of channels which run between the first diverter inlet 36 and the first set of diverter outlets 37a. The air diverter 34 may comprise a second set of channels which run between the second diverter inlet 39 and the second set of diverter outlets 37b.

The first heat shield inlet 30 may be located closer to the turbine(s) 24 of the turbocharger(s) 22 than to the heat shield outlet 29. The second heat shield inlet 31 may be located closer to the turbine(s) 24 of the turbocharger(s) 22 than to the heat shield outlet 29. The first heat shield inlet 30 and/or the second heat shield inlet 31 may be located to one side of the turbine(s) 24 and the heat shield outlet 29 to the other side of the turbine(s) 24. In this way, the airflow is caused to run past the turbine(s) 24 drawings hot air towards the heat shield outlet 29.

Figure 6:
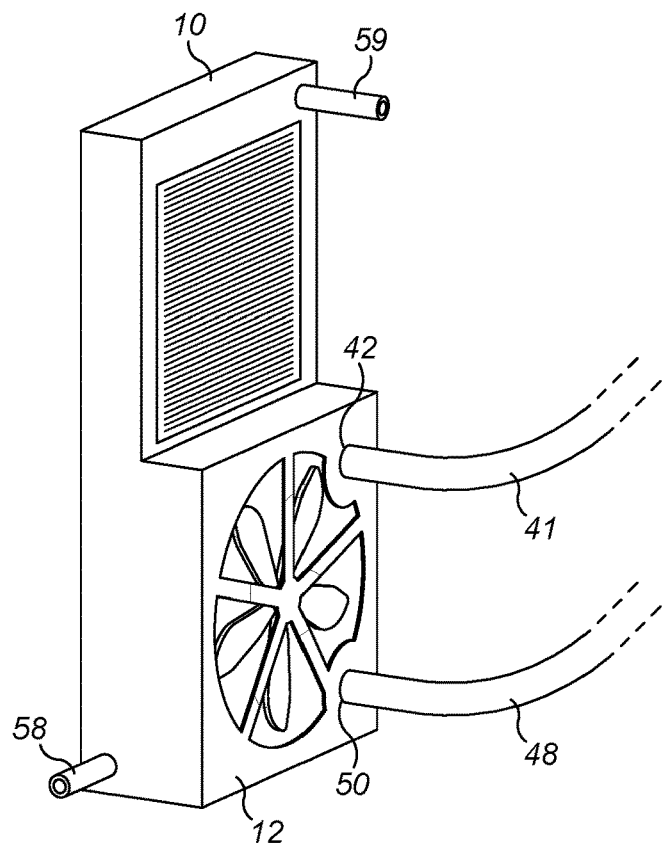
FIG. 6 shows a heat exchanger.

As discussed herein, the vehicle 1 comprises a first heat exchanger 10 and a first fan 12 for the first heat exchanger 10. FIG. 6 shows first heat exchanger 10. It will be understood that the configuration shown in FIG. 6 may apply equally to the second heat exchanger 11. First heat exchanger 10 comprises at least one coolant inlet 58 and at least one coolant outlet 59.

The vehicle comprises a first duct 41. The first duct 41 is connected between the first fan 12 and the first heat shield inlet 30. The first fan 12 comprises a first offtake 42 to which the first duct 41 is connected. The first offtake 42 may be a spigot to which the first duct 41 is connected. The first offtake 42 is positioned so that at least part of an airflow generated by the first fan 12, when the fan 12 is in operation, is directed into the first duct 41. In this way, the first duct 41 is connected to the first fan 12 so that at least part of an airflow generated by the fan 12 is directed into the first duct 41. Equally, airflow not generated by the fan 12 but that is passing through the first heat exchanger 10 would be directed into the first duct 41. For instance, when the vehicle 1 is in motion. Thus, an airflow being channelled into the first duct 41 flows to the first heat shield inlet 30. This airflow can then be directed by the heat shield 28.

The vehicle comprises a second duct 43. The second duct 43 is connected between the second fan 13 and the second heat shield inlet 31. The second fan 13 comprises a first offtake 44 to which the second duct 43 is connected. The first offtake 44 may be a spigot to which the second duct 43 is connected. The first offtake 44 is positioned so that at least part of an airflow generated by the second fan 13, when the second fan 13, is in operation, is directed into the second duct 43. Equally, airflow not generated by the fan 13 but that is passing through the second heat exchanger 11 would be directed into the second duct 42. For instance, when the vehicle 1 is in motion. Thus, an airflow being channelled into the second duct 43 flows to the second heat shield inlet 31. This airflow can then be directed by the heat shield 28.

As discussed herein, the heat shield 28 may comprise openings through which vehicle components can pass. Some of those openings will be able to be sealed to the component that passed through so that all or substantially all airflow through the opening can be restricted. Other openings may not be able to be sealed completely due to the vehicle component that passes through them. For instance, if a moveable component passes through the opening then it may not be possible to attach a seal to the component. FIG. 4 shows such an opening 45. The first opening 45 runs between the inner surface 33 and an outer surface 46 of the heat shield 28. To mitigate against hot air passing from within the heat shield 28 to the region near the first opening 45 outside the heat shield 28, a supply of air is provided to near the first opening 45 within the engine bay 47 of the vehicle 1.

The vehicle comprises a third duct 48. The outlet of the third duct 48 is positioned to direct an airflow running through the fourth duct onto the first opening 45. This airflow is capable of cooling hot air escaping from inside the heat shield via the first opening 45. The third duct 48 is connected between the first fan 12 and the third duct outlet 49. The first fan 12 comprises a second offtake 50 to which the third duct 48 is connected. The second offtake 50 may be a spigot to which the third duct 48 is connected. The second offtake 50 is positioned so that at least part of an airflow generated by the first fan 12, when the fan 12 is in operation, is directed into the third duct 48. In this way, the third duct 48 is connected to the first fan 12 so that at least part of an airflow generated by the fan 12 is directed into the third duct 48. Equally, airflow not generated by the fan 12 but that is passing through the first heat exchanger 10 would be directed into the third duct 48. For instance, when the vehicle 1 is in motion. Thus, an airflow being channelled into the third duct 48 flows to the third duct outlet 49. This airflow can then be directed on to the first opening 45.

A second opening 51 in the heat shield 28 runs between the inner surface 33 and the outer surface 46 of the heat shield 28. The second opening 51 may be spaced from the first opening 45 along the lateral direction of the engine. The vehicle comprises a fourth duct 52. The outlet of the fourth duct 52 is positioned to direct an airflow running through the fourth duct onto the second opening 51. This airflow is capable of cooling hot air escaping from inside the heat shield via the second opening 51. The fourth duct 52 is connected between the second fan 13 and the fourth duct outlet 53. The second fan 13 comprises a second offtake 54 to which the fourth duct 52 is connected. The second offtake 54 may be a spigot to which the fourth duct 52 is connected. The second offtake 54 is positioned so that at least part of an airflow generated by the second fan 13, when the fan 13 is in operation, is directed into the fourth duct 52. In this way, the fourth duct 52 is connected to the second fan 13 so that at least part of an airflow generated by the fan 13 is directed into the fourth duct 52. Equally, airflow not generated by the fan 13 but that is passing through the second heat exchanger 11 would be directed into the fourth duct 52. For instance, when the vehicle 1 is in motion. Thus, an airflow being channelled into the fourth duct 52 flows to the fourth duct outlet 53. This airflow can then be directed on to the second opening 51.

The turbochargers 22 may each comprise a waste valve 55 to divert excess exhaust gases away from the turbine 24. This waste valve 55 is actuated by an actuator 56. A first linkage 57 may run through the first opening 45. The first linkage 57 is connected between a first actuator 56 and a first waste valve 55 associated with a first turbine 24 so that the actuator 56 can open and close the first waste valve 55. In a similar fashion, a second linkage may run through the second opening 51. The second linkage is connected between a second actuator and a second waste valve associated with a second turbine 24 so that the actuator can open and close the second waste valve.

Figure 7:
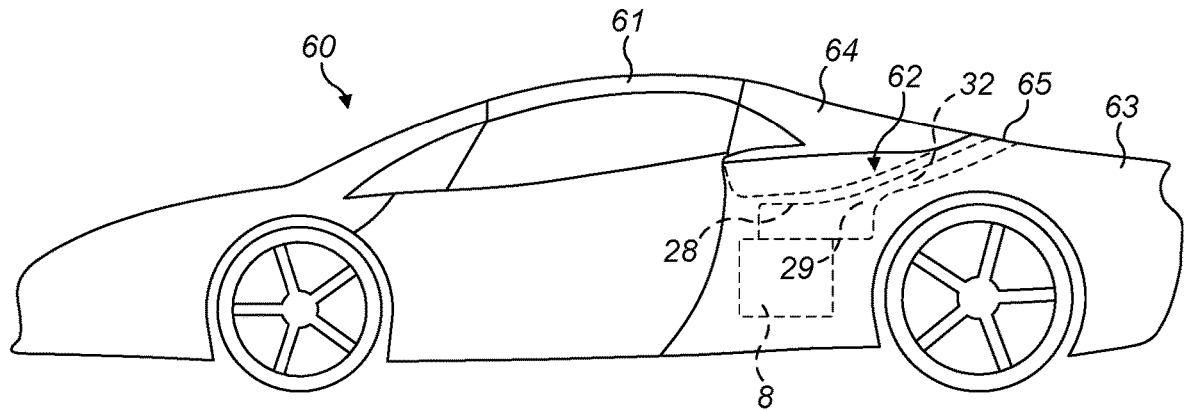
FIG. 7 shows a vehicle having a retractable roof in its deployed configuration.

FIGS. 7 and 8 show a vehicle 60 having a retractable roof 61. The vehicle 60 of FIGS. 7 and 8 may have any of the features of the vehicle 1 described with reference to FIGS. 1 to 6. FIG. 7 shows the retractable roof in its deployed configuration.

FIG. 8 shows the retractable roof 61 in its retracted configuration. The retractable roof is configured to move between a deployed configuration as shown in FIG. 7 and a retracted configuration as shown in FIG. 8. The retractable roof 61 may be a hard-top retractable roof 61 as shown in FIG. 8. The retractable roof 61 shown in FIG. 7 comprises a single roof element 61 that is moveable between a deployed configuration where the roof element 61 covers the occupant cabin 4 and a retracted configuration where the roof element 61 does not cover the occupant cabin 4. The retractable roof 61 may comprise multiple roof elements that together form the roof of the vehicle 60. These roof elements may be positioned next to one another to form the roof of the vehicle. The number and configuration of the roof elements is dependent on the size and shape of the occupant cabin 4 that needs to be covered by the retractable roof 61. The movement of the retractable roof 61 is controlled by one or more actuators that are coupled to the retractable roof 61 to permit movement of the roof element(s) between the deployed configuration and the retracted configuration. The actuators may be coupled to the retractable roof by one or more linkages. The actuators may be hydraulic and/or electric. The hard-top retractable roof may comprise all rigid roof members or may comprise some flexible roof members together with rigid roof members.

Alternatively, the retractable roof 61 may be a soft-top retractable roof. The retractable roof may comprise one or more flexible roof members that are supported by a frame. The frame may be moveable to permit the retractable roof to move between the deployed configuration and the retracted configuration. The frame may be coupled to one or more actuators to permit movement of the frame and thus the retractable roof.

The vehicle 60 comprises a housing 62 that is configured to house the retractable roof when the roof is in the retracted configuration. It is shown schematically in FIGS. 6 and 7 because it is located within the vehicle body 63 and beneath moveable cover 64. Housing 62 may be a discrete housing and/or may be formed from body panels of the vehicle body 63 that also serve another purpose. For instance, as shown in FIGS. 6 and 7 covering an engine bay. FIG. 8 shows the retractable roof in its retracted configuration as shown by the schematic representation of the retractable roof located within housing 62. The housing 62 may be shaped to receive the retractable roof. The housing 62 may be sized so as to accommodate the retractable roof element(s) together with the associated linkages and actuators.

The vehicle 1 comprises a moveable cover 64. The moveable cover 64 closes the housing so that when the retractable roof 61 is in the retracted configuration the retractable roof 61 is enclosed in a space defined by the housing 62 and the underside of the movable cover 64. The moveable cover 64 may comprise seals to seal the moveable cover 64 to other body panels of the vehicle body 63 and/or to the housing 62.

The moveable cover 64 is configured to move between a closed configuration where the moveable cover closes the housing and an open configuration where the moveable cover 64 can permit the retractable roof to move between the deployed configuration and the retracted configuration. In the open configuration the front of the moveable cover 64 is raised to permit access to the housing 62. The raising of the front of the moveable cover 64 permits the retractable roof 61 to move through the space located between the front of the moveable cover 64 and the rest of the vehicle body 63 so that it can move into and out of the housing 62.

The housing 62 is located above the heat shield 28. The heat shield outlet 29 is connected to an outlet duct 32. The outlet duct 32 may be angled rearwards so that the outlet duct 32 passes under the housing 62 and runs to a location on a rear deck of the vehicle 60 which is rearward of the housing 62. In this way, the housing 62 and retractable roof 61 can be protected from the heat output by the exhaust components. The heat being output at the outlet duct output 65 rearward of the housing.

Figure 9:
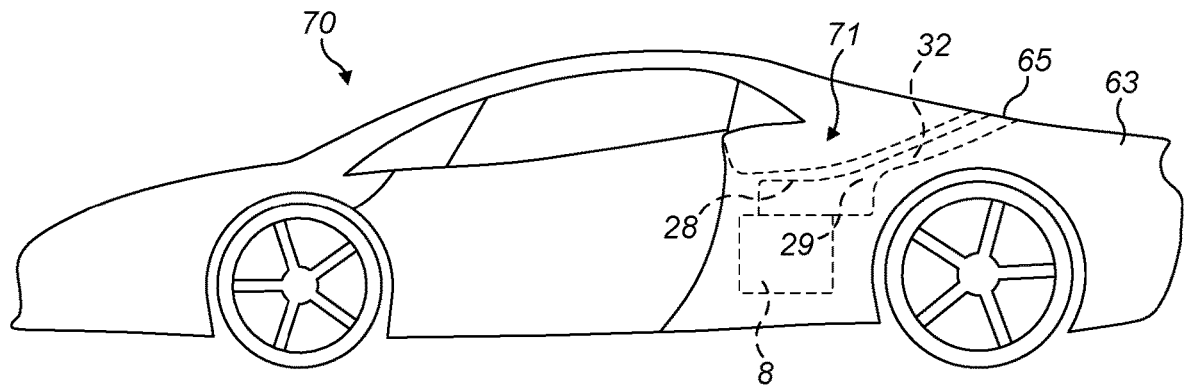
FIG. 9 shows a vehicle having a luggage storage area.

FIG. 9 shows a vehicle 70 comprising a luggage storage area 71 behind the occupant seats 5. The vehicle 60 of FIG. 9 may have any of the features of the vehicle 1, 60 described with reference to FIGS. 1 to 8. Luggage storage area 71 is located above the heat shield 28. The heat shield outlet 29 is connected to an outlet duct 32. The outlet duct 32 may be angled rearwards so that the outlet duct 32 passes under the luggage storage area 71 and runs to a location on a rear deck of the vehicle 70 which is rearward of the luggage storage area 71. In this way, the luggage storage area 71 can be protected from the heat output by the exhaust components. The heat being output at the outlet duct output 65 rearward of the housing.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A vehicle comprising:
    an engine comprising two banks of cylinders having axial directions angled relative to each other to form a region running between the axial directions of the two banks of cylinders;
    a plurality of exhaust components located in the region; and
    a heat shield enclosing the plurality of exhaust components between the engine and the heat shield, the heat shield comprising an inner surface facing the plurality of exhaust components, a first heat shield inlet and a heat shield outlet, and the heat shield being configured to channel an airflow between the first heat shield inlet and the heat shield outlet over the inner surface of the heat shield;
    wherein the heat shield comprises an air diverter comprising a first diverter inlet and a plurality of diverter outlets, the air diverter being configured to disperse an airflow entering from the first heat shield inlet over the inner surface of the heat shield.

2. The vehicle according to claim 1, wherein the heat shield comprises a second heat shield inlet, the heat shield is configured to channel an airflow between the second heat shield inlet and the heat shield outlet over the inner surface of the heat shield, and the air diverter is configured to disperse an airflow entering from the second heat shield inlet over the inner surface of the heat shield.

3. The vehicle according to claim 2, wherein the air diverter comprises a second diverter inlet, the air diverter being located within the heat shield so that the airflow entering from the second heat shield inlet is directed to diverter outlets from the second diverter inlet to disperse the airflow entering from the second heat shield inlet over the inner surface of the heat shield.

4. The vehicle according to claim 3, wherein the diverter outlets are divided into a first set of diverter outlets and a second set of diverter outlets, the first diverter inlet is connected to the first set of diverter outlets and the second diverter inlet is connected to the second set of diverter outlets, and wherein the air diverter is located within the heat shield so that the first heat shield inlet is aligned with the first diverter inlet and the second heat shield inlet is aligned with the second diverter inlet.

5. The vehicle according to claim 2, the vehicle comprising:
    a second heat exchanger;
    a second fan configured to cause air to flow through the second heat exchanger; and
    a second duct connected between the second fan and the second heat shield inlet so that when the second fan is active the second duct channels air between the second fan and the second heat shield inlet.

6. The vehicle according to claim 5, wherein the heat shield comprises a second opening between the inner surface and an outer surface of the heat shield, and the vehicle comprising a fourth duct comprising a fourth duct outlet positioned to direct an airflow running through the fourth duct onto the second opening, the fourth duct being connected between the second fan and the third duct outlet.

7. The vehicle according to claim 2, the vehicle comprising a turbocharger, the turbocharger comprising a compressor and a turbine, wherein the plurality of exhaust components comprises the turbine of the turbocharger, and wherein the second heat shield inlet is located closer to the turbine than the heat shield outlet.

8. The vehicle according to claim 1, wherein the air diverter is located within the heat shield so that the airflow entering from the first heat shield inlet is directed to the plurality of diverter outlets from the first diverter inlet to disperse the airflow entering from the first heat shield inlet over the inner surface of the heat shield, and wherein the air diverter comprises a plurality of channels running between the first diverter inlet and a respective diverter outlet.

9. The vehicle according to claim 1, the vehicle comprising:
    a first heat exchanger;
    a first fan configured to cause air to flow through the first heat exchanger; and
    a first duct connected between the first fan and the first heat shield inlet so that when the first fan is active the first duct channels air between the first fan and the first heat shield inlet.

10. The vehicle according to claim 9, wherein the heat shield comprises a first opening between the inner surface and an outer surface of the heat shield, and the vehicle comprising a third duct comprising a third duct outlet positioned to direct an airflow running through the third duct onto the first opening, the third duct being connected between the first fan and the third duct outlet.

11. The vehicle according to claim 10, wherein the vehicle comprises a turbocharger, the turbocharger comprising a compressor, a turbine and a waste valve, and wherein the vehicle comprises a first actuator located outside of the heat shield and a first linkage connected between the waste valve and the first actuator, the first linkage running through the first opening, wherein the plurality of exhaust components comprise the turbine of the turbocharger.

12. The vehicle according to claim 1, the vehicle comprising a turbocharger, the turbocharger comprising a compressor and a turbine, and wherein the plurality of exhaust components comprise the turbine of the turbocharger.

13. The vehicle according to claim 12, wherein the compressor is located outside of the heat shield.

14. The vehicle according to claim 12, wherein the first heat shield inlet is located closer to the turbine than the heat shield outlet.

15. The vehicle according to claim 1, the vehicle comprising a turbocharger per bank of cylinders, each turbocharger comprising a compressor and a turbine, and wherein the plurality of exhaust components comprises the turbines of the turbochargers.

16. The vehicle according to claim 15, wherein the turbochargers each comprise a respective waste valve and the vehicle comprises an actuator per waste valve located outside of the heat shield and a linkage per waste valve connected between respective waste valves and respective actuators, a first linkage running through a first opening, the first opening running between the inner surface and an outer surface of the heat shield, and a second linkage running through a second opening, the second opening running between the inner surface and an outer surface of the heat shield.

17. The vehicle according to claim 1, wherein the plurality of exhaust components comprises one or more of an exhaust manifold, an exhaust pipe, and an exhaust gas treatment device.

18. The vehicle according to claim 1, wherein the heat shield comprises an insulation layer sandwiched between metal layers, the insulation layer having a thickness which varies over the heat shield.

19. The vehicle according to claim 1, the vehicle comprising:
- an occupant cabin;
- a retractable roof configured to move between a deployed configuration where the roof covers the occupant cabin and a retracted configuration;
- a housing configured to house the retractable roof when the roof is in the retracted configuration, the housing being positioned at least partially over the heat shield; and
- a moveable cover configured to close the housing;
- at least one passenger seat located in the occupant cabin; and
- a luggage storage area located behind the passenger seat, the luggage storage area being positioned at least partially over the heat shield.

20. The vehicle according to claim 1, wherein the heat shield comprises a first heat shield piece, a second heat piece and a gasket comprising a cylindrical portion and a flat portion joined to the cylindrical portion, the first heat shield piece and second heat shield piece being joined together, the gasket being located between the first heat shield piece and the second heat shield piece so that the flat portion is between the first heat shield piece and second heat shield piece and the cylindrical portion contacts both the first heat shield piece and second heat shield piece.

* * * * *